United States Patent
Kawakatsu

(10) Patent No.: US 6,792,580 B2
(45) Date of Patent: Sep. 14, 2004

(54) METHOD AND COMPUTER PROGRAM PRODUCT FOR SOFTWARE/HARDWARE LANGUAGE MODEL CONVERSION

(75) Inventor: Noritaka Kawakatsu, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/059,185

(22) Filed: Jan. 31, 2002

(65) Prior Publication Data

US 2004/0015900 A1 Jan. 22, 2004

(30) Foreign Application Priority Data

Jan. 31, 2001 (JP) ........................................ 2001-024887

(51) Int. Cl.$^7$ .............................................. G06F 17/50
(52) U.S. Cl. ....................... 716/3; 716/1; 716/2; 716/16
(58) Field of Search ................ 716/2, 16, 17, 716/3, 4, 5, 18; 704/2, 278; 703/13, 14; 370/572, 410, 397, 352; 342/359; 340/825.5; 326/41, 40, 38; 717/149, 151, 158; 700/83

(56) References Cited

U.S. PATENT DOCUMENTS

| | | | | |
|---|---|---|---|---|
| 6,021,266 A | * | 2/2000 | Kay ............................... | 716/2 |
| 6,023,583 A | * | 2/2000 | Honda ......................... | 717/158 |
| 6,152,612 A | * | 11/2000 | Liao et al. ..................... | 703/23 |
| 6,467,075 B1 | * | 10/2002 | Sato et al. ..................... | 716/18 |
| 6,490,545 B1 | * | 12/2002 | Peng ............................ | 703/13 |
| 2002/0188916 A1 | * | 12/2002 | Ito ................................ | 716/4 |
| 2003/0005404 A1 | * | 1/2003 | Bowyer et al. ............... | 716/18 |
| 2003/0084410 A1 | * | 5/2003 | Rankin .......................... | 716/3 |

OTHER PUBLICATIONS

Yong Zhang, "A software/hardware co–design methodology for embedded microprocessor core design", Nov 1999, Concumer Electronics, IEEE Transactions on, vol. 45, Issue, pp. 1241–1246.*

* cited by examiner

Primary Examiner—Matthew Smith
Assistant Examiner—Helen Rossoshek
(74) Attorney, Agent, or Firm—Oblon, Spivak, McClelland, Maier & Neustadt, P.C.

(57) ABSTRACT

The first model described in a software description language is converted into the second model described in a hardware description language without considering whether a plurality of parallel procedures for writing with respect to the same shared variable are contained in the first model. It is detected whether a plurality of parallel processes corresponding to the plurality of parallel procedures for writing with respect to the same shared variable exist in the second model obtained in this manner. A value solving process is generated, in which a pair of a data signal and an assignment timing signal are input from each process of all or some of the detected parallel processes, and a signal of the data signals which corresponds to a process in which the assignment timing signal has changed is output to a signal holding the value of the shared variable.

20 Claims, 10 Drawing Sheets

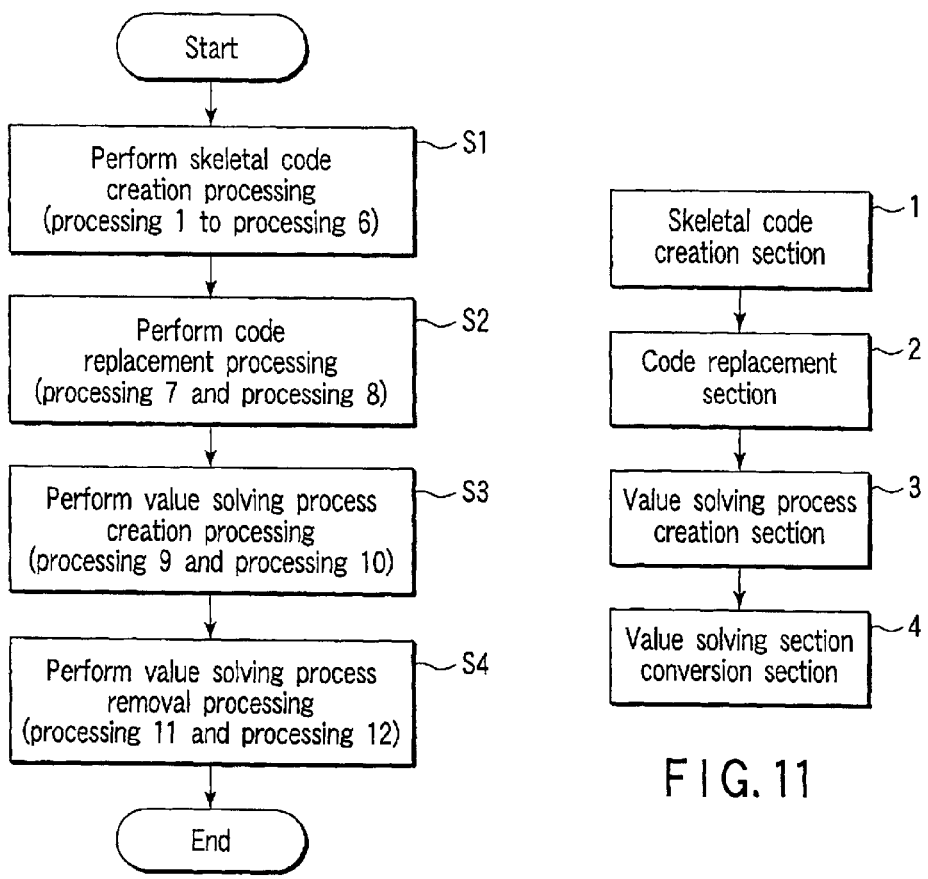
F I G. 9
F I G. 11
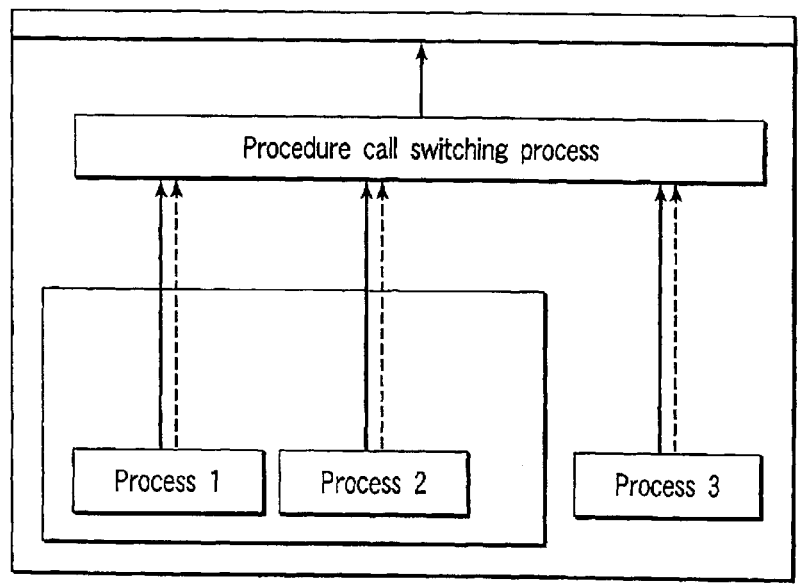
F I G. 10

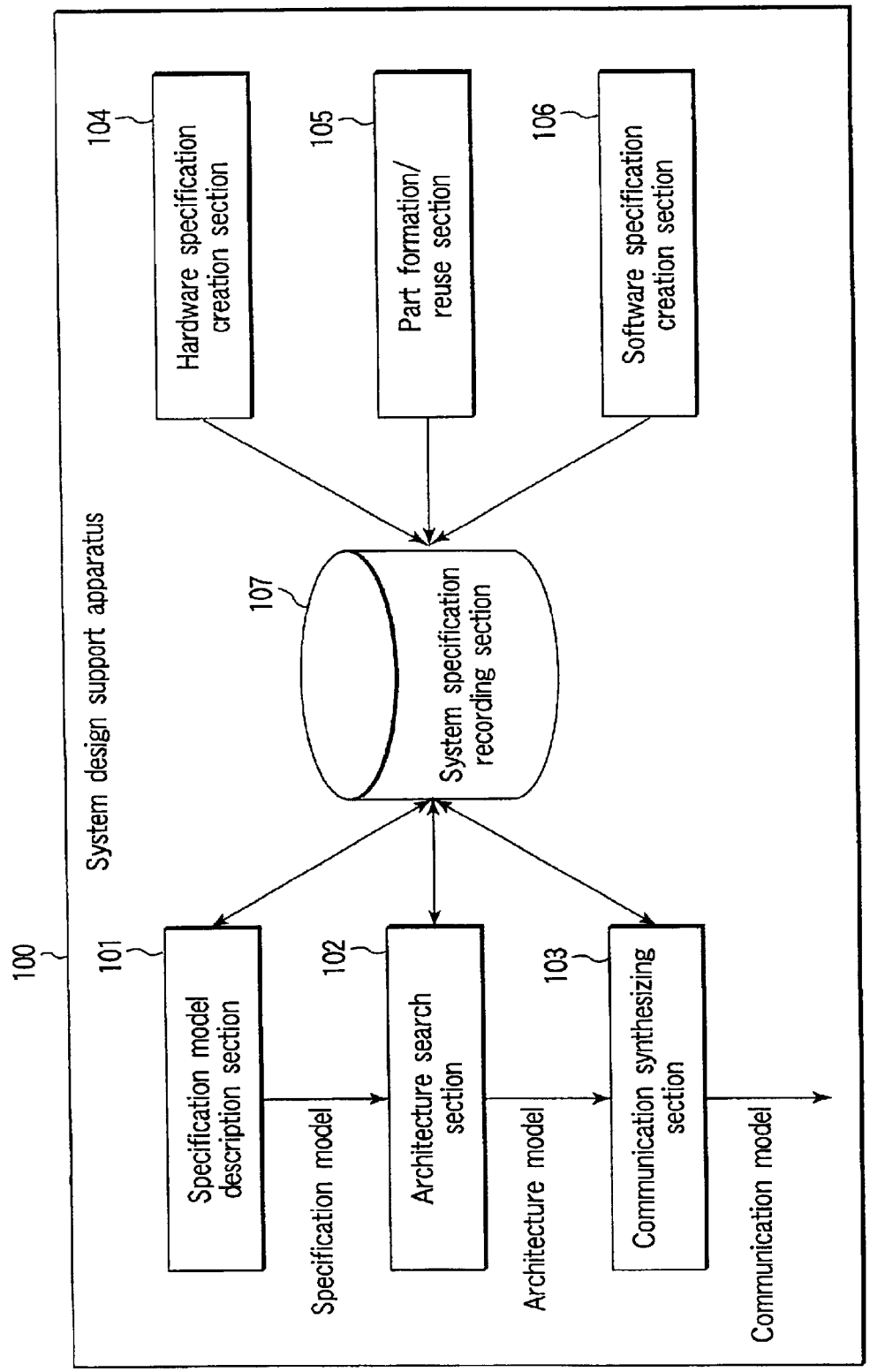
F I G. 18

METHOD AND COMPUTER PROGRAM PRODUCT FOR SOFTWARE/HARDWARE LANGUAGE MODEL CONVERSION

CROSS-REFERENCE TO RELATED APPLICATIONS

This application is based upon and claims the benefit of priority from the prior Japanese Patent Application No. 2001-024887, filed Jan. 31, 2001, the entire contents of which are incorporated herein by reference.

BACKGROUND OF THE INVENTION

1. Field of the Invention

The present invention relates to a software/hardware language model conversion method and computer program product for automatically converting a software description into a hardware operation description.

2. Description of the Related Art

Recently, attention has been given to the design of an overall system or hardware by using a software description language such as C, C++, or specification description language SpecC (described in detail in "SpecC: Specification Language and Methodology", Daniel D. Gajski, Kluwer Academic Publishers, Dordrecht, ISBN0-7923-7822-9). This is a technique of describing a specification in a software description language and converting it into a specification in a hardware description language such as VHDL or Verilog to connect it to a downstream logic synthesizing tool in proceeding to detailed design of hardware.

Some tools for creating a hardware language model in the C language have already been commercialized. However, the codes to be input to such a tool are limited to those describing sequential processing. The tool is useful for partial design, but is not suitable for large-scale design because it includes portions that cannot be satisfactorily written in the form of a sequential specification. Demands have therefore arisen for software/hardware language model conversion that can support parallel programs.

Assume that a description in a software description language includes parallel programs. In this case, when the language is converted into a hardware description language at operation level, the manner of handling shared variables cannot be directly converted. More specifically, in software, values are determined in accordance with the order in which assignment is executed. In hardware description, if signal outputs from the respective parallel programs are simply connected, the values become undefined or determined regardless of the assignment order. Demands have therefore arisen for a method of systematically converting assignment to shared variables into assignment in hardware description.

Assume that a description in a software description language includes procedure calls that can operate parallel. In this case, when this description is converted into a hardware description language at operation level, the manner of handling calls for the same procedure cannot be directly converted. More specifically, if parallel procedures are replaced with processes, identical procedures can be simultaneously called. If, however, this operation is directly expressed by shake-hands using signals between the processes, exclusive calling cannot be realized. Demands have therefore arisen for a method of systematically creating an exclusive calling mechanism in the form of a code.

BRIEF SUMMARY OF THE INVENTION

The present invention has been made in consideration of the above situation, and has as its object to provide a software/hardware language model conversion method and computer program product for converting a software description including parallel programs and variables shared among them into a hardware description at operation level which operates in the same manner as the software description.

It is another object to provide a software/hardware language model conversion method and computer program product for realizing exclusive process execution processing corresponding to procedure calling in converting parallel programs in a software language into a hardware description.

According to one aspect of the present invention, there is provided a software/hardware language model conversion method for converting a first code described in a software description language to a second code described in a hardware description language. The method comprises: converting the first code to the second code; detecting a plurality of processes from the second code, the processes corresponding to a plurality of parallel procedures in the first code, which assign values to a predetermined shared variable; and generating a value solving process for the detected processes corresponding to the parallel procedures, wherein the value solving process includes pairs of a data signal and an assignment timing signal from each of the detected processes as an input, and includes any one of data signals corresponding to a change of the assignment timing signal, as an output.

BRIEF DESCRIPTION OF THE SEVERAL VIEWS OF THE DRAWING

FIG. 9 is a flow chart showing another example of the procedure executed by the software/hardware language model conversion apparatus according to the embodiment;

FIG. 10 is a view for explaining an example of a hardware description obtained by deleting all value solving processes except for the value solving process at the highest level, which is obtained by converting a software description of hierarchically arranged parallel software programs sharing a variable;

FIG. 11 is a block diagram showing another example of the arrangement of the software/hardware language model conversion apparatus according to the embodiment;

FIG. 18 is a block diagram showing an arrangement of a system design support apparatus according to the embodiment;

DETAILED DESCRIPTION OF THE INVENTION

Figure 1:
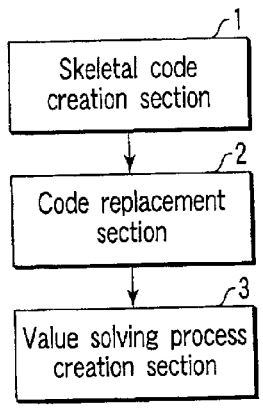
FIG. 1 is a block diagram showing an arrangement of a software/hardware language model conversion apparatus according to an embodiment of the present invention.

An embodiment of the present invention will be described below with reference to the views of the accompanying drawing.

FIG. 18 shows an arrangement of a system design support apparatus 100 according to an embodiment of the present invention. As shown in FIG. 18, the system design support apparatus 100 includes a specification model description section 101, architecture search section 102, communication synthesizing section 103, hardware specification creation section 104, part formation/reuse section 105, software specification creation section 106, and system specification recording section 107. The system design support apparatus 100 can be formed by using, for example, a computer. In this case, each processing portion can be executed by a program.

The system specification recording section 107 is used to record input data and all or part of the processing result obtained by each processing section, e.g., a specification for software executed by a computer, a specification for hardware combined with semiconductor devices and the like, a specification for an incorporated system constituted by a combination of software and hardware, and a specification on system level for a specification for a business process such as a work flow, and other necessary data.

The specification model description section 101 supports a designer to describe specifications for computation contents and communication contents according to a predetermined specification description form. As a result of support provided by the specification model description section 101, a specification model is created. The specification description form includes, for example, a structured text form represented by a structured programming language, a structural chart form using graphs, and a table form using tables.

The architecture search section 102 divides a partial structure of a specification model into elements and distributing the elements to architecture elements while maintaining the contents of the specification in consideration of a supplied specification description model and an architecture (the arrangement of a hardware/software implementation environment). More specifically, parts constituting specifications for computation contents and communication contents designed by the specification model description section 101 are assigned to architecture elements.

The communication synthesizing section 103 inserts a communication procedure (protocol) between communication specification elements distributed by the architecture search section 102 and performs protocol conversion (rearrangement of a communication procedure) to match with a communication procedure in which the communication content specification is inserted.

The specification description models to be processed by the architecture search section 102 are not limited to those described by using the specification model description section 101, and may include models and the like described by other tools. The specification description models to be processed by the communication synthesizing section 103 are not limited to output results from the architecture search section 102 (or models obtained by correcting the results), and may include models described by other tools and the like.

The hardware specification creation section 104 creates a hardware specification described in hardware description language from a system specification.

The software specification creation section 106 creates a software specification from a system specification.

The hardware specification creation section 104 and software specification creation section 106 can process, for example, an output result from the specification model description section 101 (or information obtained by correcting the result), an output result from the architecture search section 102 (or information obtained by correcting the result), an output result from the communication synthesizing section 103 (or information obtained by correcting the result), or information described by other tools and the like.

The part formation/reuse section 105 forms a specification into parts and provides them for reuse in an entire or part of a design stage in the specification model description section 101, architecture search section 102, and communication synthesizing section 103.

A software/hardware language model conversion apparatus to be described in detail later is used for the hardware specification creation section 104 of the system design support apparatus in FIG. 18, thereby creating an HDL description from a system specification.

FIG. 1 shows an arrangement of a software/hardware language model conversion apparatus (to be referred to as a language model conversion apparatus hereinafter) according to an embodiment of the present invention.

As shown in FIG. 1, the language model conversion apparatus has a skeletal code creation section 1, code replacement section 2, and value solving process creation section 3.

From a model described in a software description language such as SpecC, this language model conversion apparatus creates a model described in a hardware description language such as VHDL (which operates in the same manner).

Figure 2:
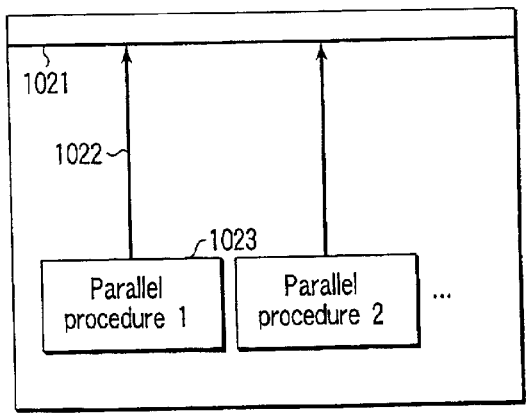
FIG. 2 is a view for explaining an example of a software description of parallel software programs sharing a variable.
Figure 3:
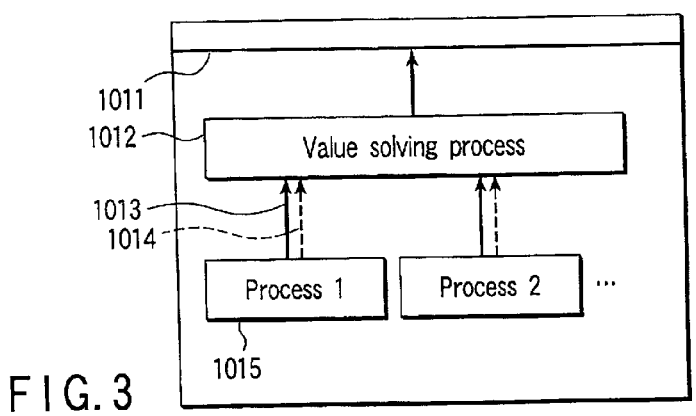
FIG. 3 is a view for explaining an example of a hardware description including a value solving process, which is obtained by converting a software description of parallel software programs sharing a variable.

This language model conversion apparatus will be briefly described first with reference to FIG. 2 (a view for explaining a software description language model) and FIG. 3 (a view for explaining hardware description language model). Referring to FIGS. 2 and 3, reference numeral 1021 denotes a shared variable; 1023, procedures that can operate parallel; 1022, outputs from the procedures; 1011, a signal holding the value of the shared variable; 1015, processes that are executed parallel; 1012, a value solving process (the arrows represent inputting and outputting of signals) created by this language model conversion apparatus; 1013, an assignment data signal for the process; and 1014, an assignment timing signal for the process.

Assume that in a software description language, shared variables are set among parallel programs, as shown in FIG. 2. In this case, as shown in FIG. 3, in a hardware description language, this language model conversion apparatus creates an assignment data signal (1013) and assignment timing signal (1014) with respect to each shared variable for each process (1015) corresponding to a value holding signal (1011) and each parallel program (1023) that can write-access the shared variable. The apparatus then creates a value solving process (1012) for switching an output to the value holding signal (1011) to a data signal (1013) to be paired with the assignment timing signal (1014) in accordance with a change in the assignment timing signal (1014). The value solving process (1012) is created by creating processing (see FIG. 8) for assignment to the data signal (1013) at a portion corresponding to shared variable assignment in the input code and a change in the assignment timing signal (1014).

Figure 4:
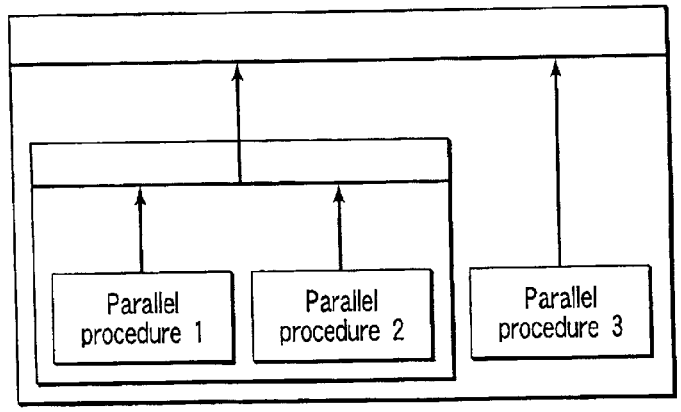
FIG. 4 is a view for explaining an example of a software description of hierarchically arranged parallel software programs sharing a variable.
Figure 5:
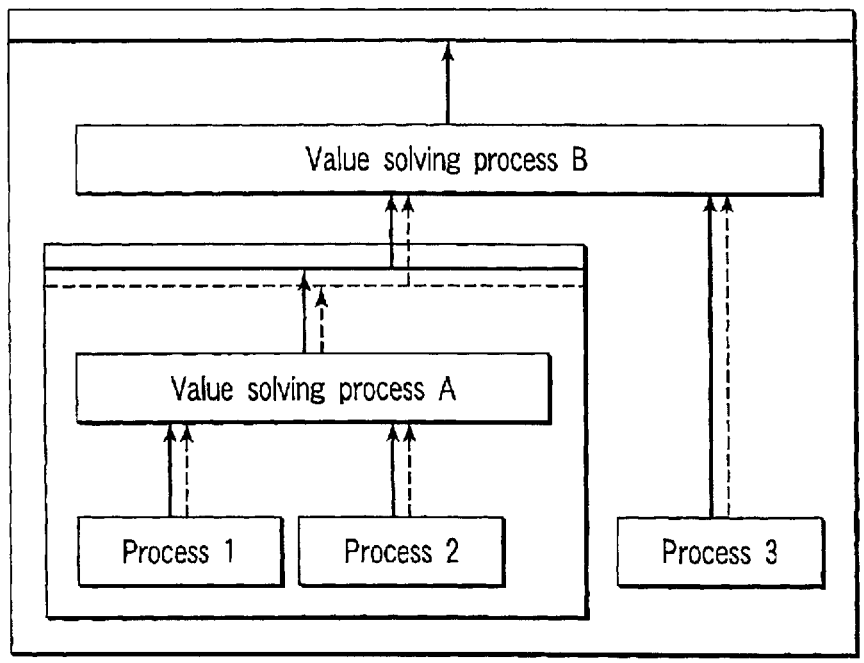
FIG. 5 is a view for explaining an example of a hardware description including hierarchically arranged value solving processes, which is obtained by converting a software description of hierarchically arranged parallel software programs sharing a variable.

Assume that in a hardware description language model output after forming the procedures in an input software description language model into a hierarchical structure, parallel processes are formed into a hierarchical structure, as shown in FIG. 4. In this case, as shown in FIG. 5, value solving processes are set at the respective levels, and signals are connected in accordance with the respective levels. In this case, an assignment timing signal is added to the output of a lower-level value solving process. If there is a level difference, a value-reflecting wait is inserted.

The processing performed by this language model conversion apparatus will be described below.

Figure 6:
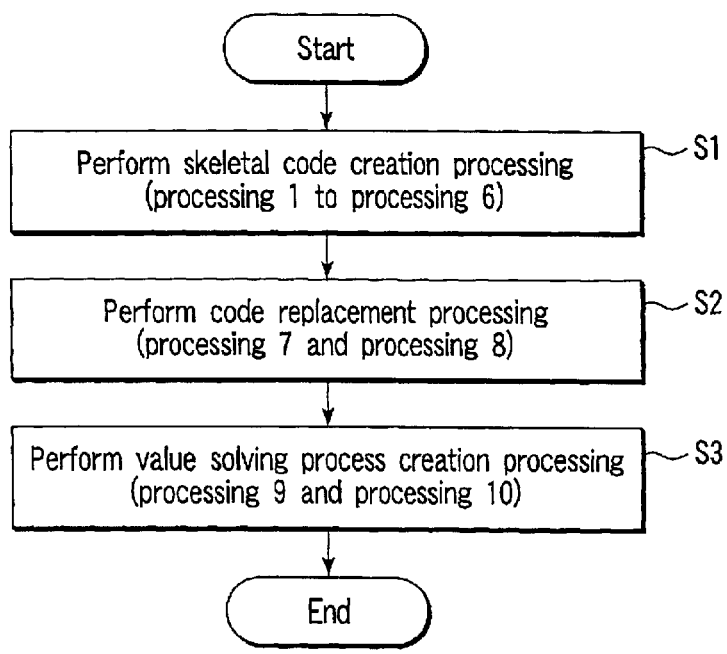
FIG. 6 is a flow chart showing an example of the procedure executed by the software/hardware language model conversion apparatus according to the embodiment.

FIG. 6 shows an example of the procedure executed by this language model conversion apparatus. As shown in FIG. 6, in this procedure, skeletal code creation processing (processing 1 to processing 6), code replacement creation processing (processing 7 and processing 8), and value solving process creation processing (processing 9 and processing 10) are performed.

Figure 7:
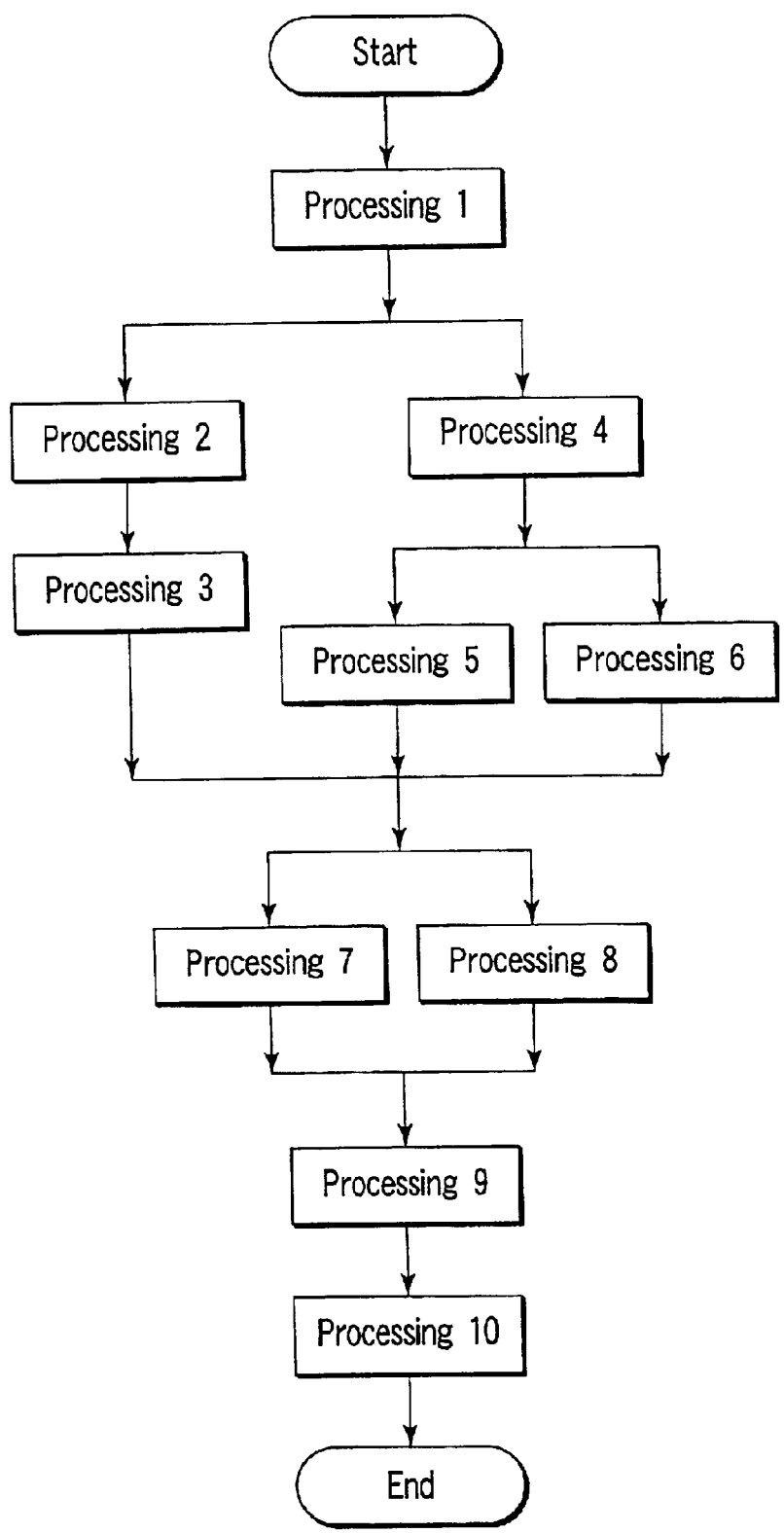
FIG. 7 is a flow chart showing an example of the procedure executed by the software/hardware language model conversion apparatus according to the embodiment.

Note that processing 1 to processing 10 to be described later can be performed in an arbitrary order as long as the execution order constraint shown in FIG. 7 (processing at the end side of an arrow must be executed after all processes at the start side of the arrow is completed). In addition, a plurality of processes may be executed parallel.

Assume that a source code in the SpecC language is input to create a VHDL source code. Assume also that a VHDL code to be output has a signal CLK as an input port signal with an IN attribute at each Entity, and its input value is a sync clock.

<Skeletal Code Creation Processing (Skeletal Code Creation Section 1)>

(Processing 1) A specification in the SpecC language is comprised of elements called C language global function, global variable, and class. Assume that in this language model conversion apparatus, only an element called class is converted. There are two types of classes, namely behavior and channel classes. In the language model conversion apparatus, each class is made to correspond to a pair of VHDL Entity and Architecture.

(Processing 2) A SpecC language class is comprised of a port variable, local variable, and function. In this language mode conversion apparatus, a port variable is made to correspond to a corresponding Architecture port signal; a local variable, to an Architecture local signal; and a function, to an Architecture process.

(Processing 3) A port variable in a SpecC language class has three types of directional attributes, namely an input attribute (in), output attribute (out), and input/output attribute (inout). In processing 2 described above, replacement of a port variable with a port signal is performed in the following manner in accordance with the directional attributes.

In the case of the input attribute (in), a signal with the IN attribute (a total of one signal) is made to correspond to the attribute.

In the case of the output attribute (out), a signal with the OUT attribute (a total of one signal) is made to correspond to the attribute.

In the case of the input/output attribute (inout), signals with the IN attribute and OUT attribute are made to correspond to the attribute.

(Processing 4) With respect to functions in a SpecC language class, an execution trigger signal (an input signal for a process) and execution state signal (an output signal for the process) are defined as call signals. With respect to a function called outside the class, a call signal is defined as an Entity port signal. If a function has an argument or return value, a corresponding input/output signal is defined at a port in the same manner.

(Processing 5) At the start of a process, a code corresponding to an external call for a function is generated in the following manner:

```
process
begin
    execution state signal <= '0 ';
    wait until execution trigger signal = '1 ';
    execution state signal <= '1 ';
    wait until CLK = '1 ' and CLK'EVENT;
    ---processing within function
end process
```

(Processing 6) With respect to a code in a function, a local variable in the function is made to correspond to a VHDL process variable. A variable assignment statement is made to correspond to an assignment statement; and wait, to a wait statement. A control syntax such as "if" is made to correspond to "VHDL if" or the like. A call for a function is made to correspond to the following code by using the signal created in processing 4 described above.

execution trigger signal<='1';

wait until execution state signal='1';

execution trigger signal<='0' wait until execution state signal='0'

<Code Replacement Processing (Code Replacement Section 2)>

(Processing 7) A signal assignment in a VHDL process block is not immediately reflected in a signal value. It is reflected when a wait statement is processed. In consideration of this effect, conversion is performed as follows. A temporary process variable is defined with respect to a VHDL signal. An assignment statement for variable:=signal; is generated immediately after the wait statement, and an assignment statement for signal<=variable; is generated immediately before the wait statement. An assignment statement to a SpecC language function exterior variable is an assignment statement to an exterior variable. In addition, the value of a temporary variable is to be referred to as the signal value.

Consider, for example, the following SpecC language code with a serving as a function exterior variable.

waitfor 100;

a=1;

a=a+1;

waitfor 100;

The following is a corresponding VHDL code, in which $\underline{a}$ represents a signal corresponding to the SpecC variable $\underline{a}$, and tmp_a is a temporary process variable corresponding to the signal.

wait for 100 ns;

tmp_a:=a;

tmp_a:=1;

tmp_a:=tmp_a+1;

a<=tmp_a;

wait for 100 ns;

If, however, an assignment destination corresponds to a SpecC language port variable, assignment is made to a signal with the OUT attribute instead of the above signal. In the case of a local signal, no special change is required.

If a SpecC language variable is of the event type, no temporary variable is generated.

Assume that in a method of representing the occurrence of an event, an event signal takes a value of '1' during one clock. With regard to an event variable, "notify e;" corresponds to assignment.

notify e;

wait for 100;

The above code is made to correspond to the following code:

e<='1';

wait until CLK='1' and CLK'EVENT;

e<='0';

wait for 100 ns;

Although an event is referred to at "wait e;", a VHDL code corresponding to this code is wait until e='1';

(Processing 8) A SpecC language class can form another class into an instance. The formation of an instance is made to correspond to a VHDL port_map declaration. However, a port may be segmented into a plurality of elements in processing 3 described above. For this reason, if a port is connected to a local variable, and the same signal is connected to a port variable, a signal with the same directional attribute is connected.

Consider, for example, the following SpecC language code:

```
behavior B0 (inout int b) ;
behavior B1 (inout int a) {
    B2 aB2 (a) ;
    // ...
} ;
A VHDL code corresponding to this code is
Entity B1 is port (a:in integer; a_out
integer; ... ) ; end B1;
Architecture B1 od B1 is
Component B0 is port (b: in integer; b_out: out
integer; ... ) ; end component;
begin
    aB2: B2 port map (a, a_out, ... ) ;
    ___    ...
    end B1;
```

<Value Solving Process Creation Processing (Value Solving Process Creation Section 3)>

(Processing 9) In each Architecture, signals subjected to assignment from a plurality of processes and port_map are detected.

With respect to a detected signal sig, (a) a data signal sig_out_f and assignment timing signal sig_otrig_f are defined as Architecture local signals for a process $\underline{f}$ to which the signals are to be assigned.

Figure 8:
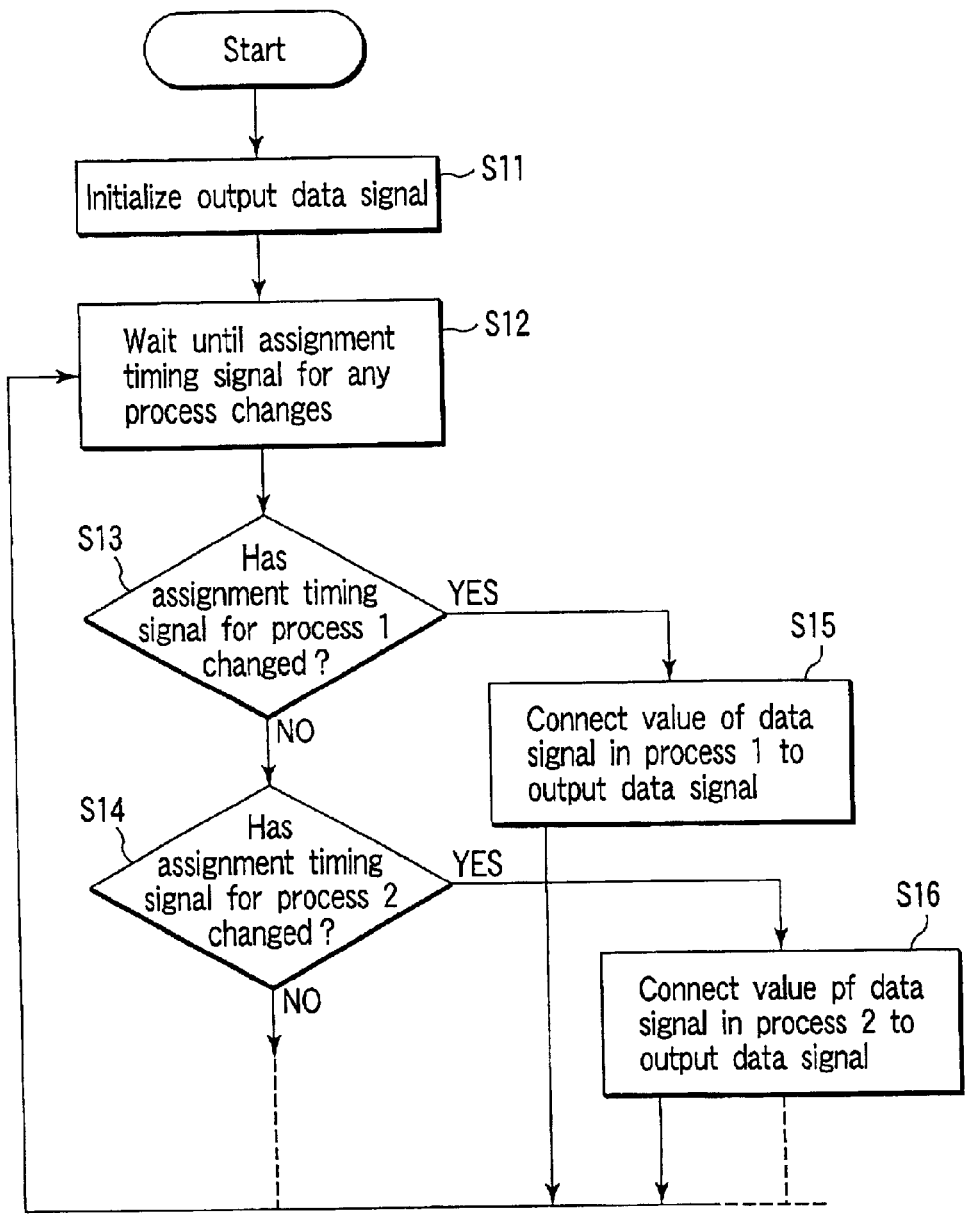
FIG. 8 is a flow chart showing an example of processing by a value solving process.

(b) The signal created in (a) is input to create a value solving process with the signal sig serving as an output. FIG. 8 shows an algorithm implemented by a process.

(c) Assignment statement sig<= expression; to "sig" in each process is replaced as follows:

sig_out_f<=expression;

sig_otrig<='1';

wait until CLK='1' and CLK'EVENT;

sig_otrig<='0';

With regard to a value solving process for a signal for function execution control, processing associated with an execution trigger and argument is performed altogether. This is because the execution trigger signal can play a role similar to that of an assignment timing signal.

(Processing 10) If a signal to which the value solving process created by processing 9 described above is output is Entity Port, an assignment timing signal may be created in processing 9. In this case, as an output of the value solving process, an assignment timing signal is added, and processing is added to change the value of the assignment timing signal at the timing when the value solving process performs processing and outputs the resultant data to an output destination.

With the above procedure, for example, a VHDL code having a structure like that shown in FIG. 5 is created from a SpecC language code having a structure like that shown in FIG. 4.

Figure 19:
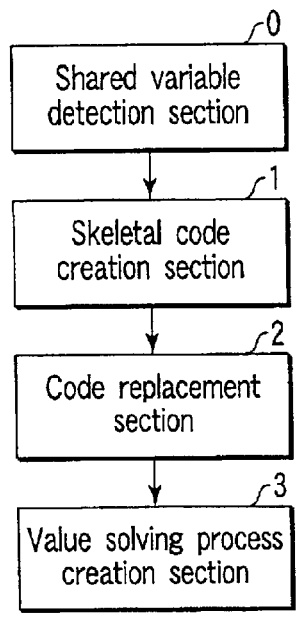
FIG. 19 is a block diagram showing an arrangement of a software/hardware language model conversion apparatus according to an alternative of the embodiment of the present invention.
Figure 20:
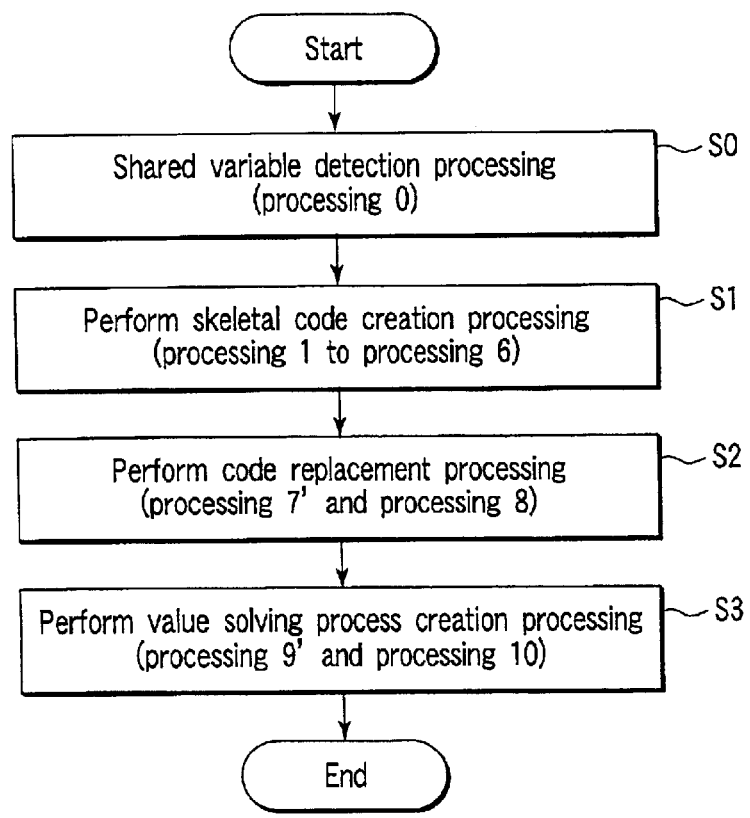
FIG. 20 is a flow chart showing an example of the procedure executed by the software/hardware language model conversion apparatus according to the alternative of the embodiment.

An alternative of the embodiment is described bellow with reference to FIG. 19 and FIG. 20.

FIG. 20 shows an example of the procedure executed by the alternative of the language model conversion apparatus. As shown in FIG. 20, in this procedure, shared variable detection processing (processing 0), skeletal code creation processing (processing 1 to processing 6), code replacement creation processing (processing 7' and processing 8), and value solving process creation processing (processing 9' and processing 10) are performed.

Note that processing 1 to processing 10 to be described later can be performed in an arbitrary order as long as the execution order constraint shown in FIG. 7 (processing at the end side of an arrow must be executed after all processes at the start side of the arrow is completed). In addition, a plurality of processes may be executed parallel.

Assume that a source code described in the SpecC language is input to create a VHDL source code. Assume also that a VHDL code to be output has a signal CLK as an input port signal with an IN attribute at each Entity, and its input value is a sync clock.

<Shared Variable Detection Processing>

(processing 0) With regarding to variables and port variables in a class, descriptions, namely "assignment descriptions" in which functions or instances thereof update the variables, are detected from the SpecC code. Let us call such the variables as "shared variable". To the shared variables, information in order to identify each of the shared variables and information indicating that which of the functions or instances thereof assigned a value to the shared variable are associated therewith and are preserved.

<Skeletal Code Creation Processing (Skeletal Code Creation Section 1)>

(Processing 1) A specification in the SpecC language is comprised of elements called C language global function, global variable, and class. Assume that in this language model conversion apparatus, only an element called class is converted. There are two types of classes, namely behavior and channel classes. In the language model conversion apparatus, each class is made to correspond to a pair of VHDL Entity and Architecture.

(Processing 2) A SpecC language class is comprised of a port variable, local variable, and function. In this language mode conversion apparatus, a port variable is made to correspond to a corresponding Architecture port signal; a local variable, to an Architecture local signal; and a function, to an Architecture process.

(Processing 3) A port variable in a SpecC language class has three types of directional attributes, namely an input attribute (in), output attribute (out), and input/output attribute (inout). In processing 2 described above, replacement of a port variable with a port signal is performed in the following manner in accordance with the directional attributes.

- In the case of the input attribute (in), a signal with the IN attribute (a total of one signal) is made to correspond to the attribute.
- In the case of the output attribute (out), a signal with the OUT attribute (a total of one signal) is made to correspond to the attribute.
- In the case of the input/output attribute (inout), signals with the IN attribute and OUT attribute are made to correspond to the attribute.

(Processing 4) With respect to functions in a SpecC language class, an execution trigger signal (an input signal for a process) and execution state signal (an output signal for the process) are defined as call signals. With respect to a function called outside the class, a call signal is defined as an Entity port signal. If a function has an argument or return value, a corresponding input/output signal is defined at a port in the same manner.

(Processing 5) At the start of a process, a code corresponding to an external call for a function is generated in the following manner:

```
    process
    begin
        execution state signal <= '0 ';
```

-continued

```
        wait until execution trigger signal = '1 ';
        execution state signal <= '1 ';
        wait until CLK = '1 ' and CLKT'EVENT;
        ---processing within function
    end process
```

(Processing 6) With respect to a code in a function, a local variable in the function is made to correspond to a VHDL process variable. A variable assignment statement is made to correspond to an assignment statement; and wait, to a wait statement. A control syntax such as "if" is made to correspond to "VHDL if" or the like. A call for a function is made to correspond to the following code by using the signal created in processing 4 described above.

execution trigger signal<='1';

wait until execution state signal='1';

execution trigger signal<='0' wait until execution state signal='0'

(Processing 7') A signal assignment in a VHDL process block is not immediately reflected in a signal value. It is reflected when a wait statement is processed. In consideration of this effect, conversion is performed as follows. A temporary process variable is defined with respect to a VHDL signal. An assignment statement for variable:=signal; is generated immediately after the wait statement, and an assignment statement for signal<=variable; is generated immediately before the wait statement. An assignment statement to a SpecC language function exterior variable is an assignment statement to an exterior variable. In addition, the value of a temporary variable is to be referred to as the signal value.

Consider, for example, the following SpecC language code with a serving as a function exterior variable.

wait for 100;

a=1;

a=a+1;

wait for 100;

The following is a corresponding VHDL code, in which a represents a signal corresponding to the SpecC variable a, and tmp__a is a temporary process variable corresponding to the signal.

wait for 100 ns;

tmp__a:=a;

tmp__a:=1;

tmp__a:=tmp__a+1;

a<=tmp__a;

wait for 100 ns;

If, however, an assignment destination corresponds to a SpecC language port variable, assignment is made to a signal with the OUT attribute instead of the above signal.

Then, it is determined that weather the variable a is a shared variable with reference to the preservation made in processing 0. If the variable a is the shared variable, a data signal is generated based on a function name. A description, for example, "a__out__f<=tmp__a;(note that, "f" is the function name)", is generated. This description means that the value of "tmp__a" is assigned to the data signal, namely "a__out__f".

At the same time, an assignment timing signal based on the same function name, for example, "a__otrig__f" is also generated. Following to the above "a__out__f<tmp__a;" code, a code described bellow is inserted.

sig_otrig_f<='1';
wait until CLK='2' and CLK'EVENT;
sig_otrig_f<='0';

If a SpecC language variable is of the event type, no temporary variable is generated.

Assume that in a method of representing the occurrence of an event, an event signal takes a value of '1' during one clock. With regard to an event variable, "notify e;" corresponds to assignment.

notify e;
wait for 100;

The above code is made to correspond to the following code:

e<='1'
wait until CLK='1' and CLK'EVENT;
e<='0';
wait for 100 ns;

Although an event is referred to at "wait e;", a VHDL code corresponding to this code is wait e='1';

(Processing 8) A SpecC language class can form another class into an instance. The formation of an instance is made to correspond to a VHDL port_map declaration. However, a port may be segmented into a plurality of elements in processing 3 described above. For this reason, if a port is connected to a local variable, and the same signal is connected to a port variable, a signal with the same directional attribute is connected.

Consider, for example, the following SpecC language code:

```
behavior B0 (inout int b) ;
behavior B1 (inout int a) {
    B2 aB2 (a) ;
    // . . .
} ;
A VHDL code corresponding to this code is
Entity B1 is port (a:in integer; a_out
integer; . . . ) ; end B1;
Architecture B1 od B1 is
Component B0 is port (b: in integer; b_out: out
integer; . . . ) ; end component;
begin
    aB2: B2 port map (a, a_out, . . . ) ;
           . . .
    end B1;
```

<Value Solving Process Creation Processing (Value Solving Process Creation Section 3)>

(Processing 9') A value solving process is generated with respect to the signal, namely "sig", which is generated by replacing the variable thereto which is detected in advance as the shared variable in processing 0. Input signals to the value solving process are the signals which are generated with respect to the variables considered in processing 7'. An output signal from the value solving process is assumed as the signal sig.

The value solving process handles, for a signal relating to function execution control, processing associated with an execution trigger and argument altogether. Note that the execution trigger signal can play a role similar to that of an assignment timing signal.

(Processing 10) If a signal to which the value solving process created by processing 9' described above is output is Entity Port, an assignment timing signal may be created in processing 9'. In this case, as an output of the value solving process, an assignment timing signal is added, and processing is added to change the value of the assignment timing signal at the timing when the value solving process performs processing and outputs the resultant data to an output destination.

With the above procedure, for example, a VHDL code having a structure like that shown in FIG. 5 is created from a SpecC language code having a structure like that shown in FIG. 4.

Another example of the processing performed by this language model conversion apparatus will be described next.

FIG. 9 shows another example of the procedure executed by this language model conversion apparatus.

In general, a SpecC language code has a tree structure formed among classes. Therefore, a VHDL code output in accordance with the procedure in FIG. 6 upon reception of the SpecC language code also has a tree structure formed among Entity-Architecture pairs. That is, with regard to the value solving process created in the value solving process creation processing (processing 9 and processing 10) based on the procedure shown in FIG. 6, a tree structure of the value-solving process is generally formed in accordance with the tree structure.

In the procedure shown in FIG. 9, first of all, a procedure similar to that shown in FIG. 6 is performed, and then the value solving process creation section 3 performs value solving process removal processing (processing 11 and processing 12). If a program has a hierarchical structure, one value solving process is created. For example, of the value solving processes (see FIG. 5) created by the procedure shown in FIG. 6, the value solving process at the highest level is integrated with the value solving processing having the hierarchical structure. As a result, for example, the structure shown in FIG. 10 is obtained. In value solving processing removable processing, all the processes except for the process at the highest level are removed, and hence the assignment data signal and assignment timing signal belonging to a lower level are connected as port signals of each component to a component at an upper level.

Value solving process removable processing will be described below.

<Value Solving Process Removable Processing (Value Solving Process Creation Section 3)>

(Processing 11) A value solving process having no assignment timing signal at its output exists at the highest level of the value solving process. Other processes will be called "removable value solving processes". The removable value solving processes are removed.

(Processing 12) The input of each process removed in processing 11 described above is developed into an Entity port. The output port of the removed process is removed. This processing is sequentially performed from the value solving process at the lowest level. When a value solving process at an intermediate level is processed, the input signal port portion of port_map is replaced with another port group, and the replacing signal group is regarded as an input signal. Finally, the input of the value solving process at the highest level becomes a data signal and assignment timing signal from a process having assignment processing to signals at all the levels.

As described above, according to this embodiment, a software description containing parallel programs and a variable shared among the programs can be converted into a hardware description at the operation level which operates in the same manner.

A case where parallel processes are hierarchically arranged can also be properly handled. Note that an arrangement for forming value solving processes into a hierarchical structure or an arrangement for leaving only a value solving process at the highest level may be selected (in the former case, operation may be performed up to processing 10; in the latter case, operation may be performed up to processing 12). For example, when the number of port signals is to be decreased, the former arrangement is selected, whereas when a process structure is hierarchically deep and any excess wait processing is to be avoided, the latter arrangement is selected.

FIG. 11 shows another arrangement called a language model conversion apparatus according to an embodiment of the present invention. This language model conversion apparatus is obtained by adding a value solving process conversion section 4 to the arrangement shown in FIG. 1.

Figure 12:
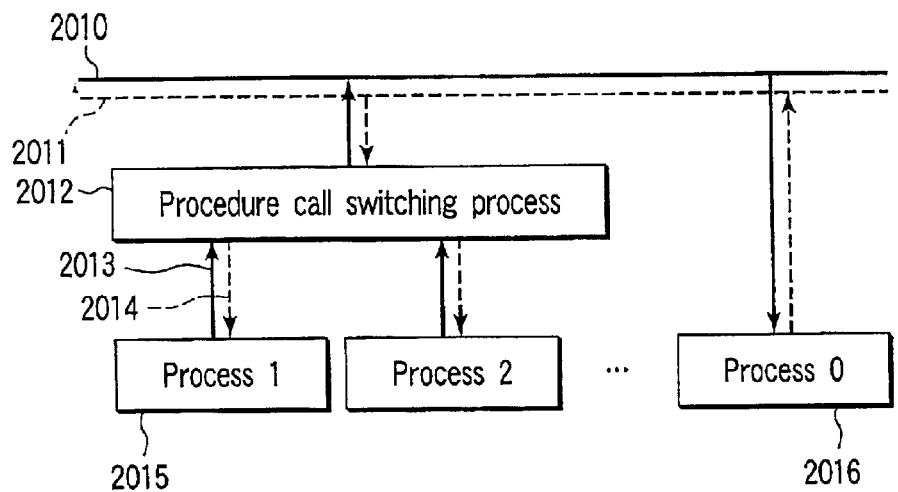
FIG. 12 is a view for explaining an example of a hardware description including a procedure call switching process, which is obtained by converting a hardware description including a value solving process.

Value solving process conversion processing will be briefly described below with reference to FIG. 12 (a view for explaining a hardware description language model). Referring to FIG. 12, reference numeral 2015 denotes a calling-side process; 2016, a called-side process; 2010, an execution activation trigger signal to a (calling-side) process; 2011, an execution state signal from a (called-side) process; 2012, a procedure call switching process (the process obtained by converting a value solving process by value solving process conversion processing) for calling a process; 2013, an execution activation trigger signal for calling another process from a (calling-side) process; and 2014, an execution state signal for calling another process from a (calling-side) process.

Procedure calling between parallel programs in a software description language model is expressed as follows in a hardware description language model.

As a code for calling a procedure for converting parallel programs into parallel programs, the following code is created.

A procedure is called by using the trigger signal 2013 (2011) output from the calling-side process 2015 and the execution state signal 2011 (2014) output from the called-side process 2016. In addition, the argument signal output from the calling-side process and the return value signal output from the called-side process may be used.

(1) Assume that a trigger is enabled until a called-side process is actually executed.
(2) For the called-side process, a procedure call switching process for switching an (output) trigger signal, argument, (input) execution state, and return value signal is created.
(3) For each parallel process corresponding to the called-side process, a trigger signal (to be output to a calling process), argument, execution state (input to the calling process), and return value signal are prepared separately.

Figure 15:
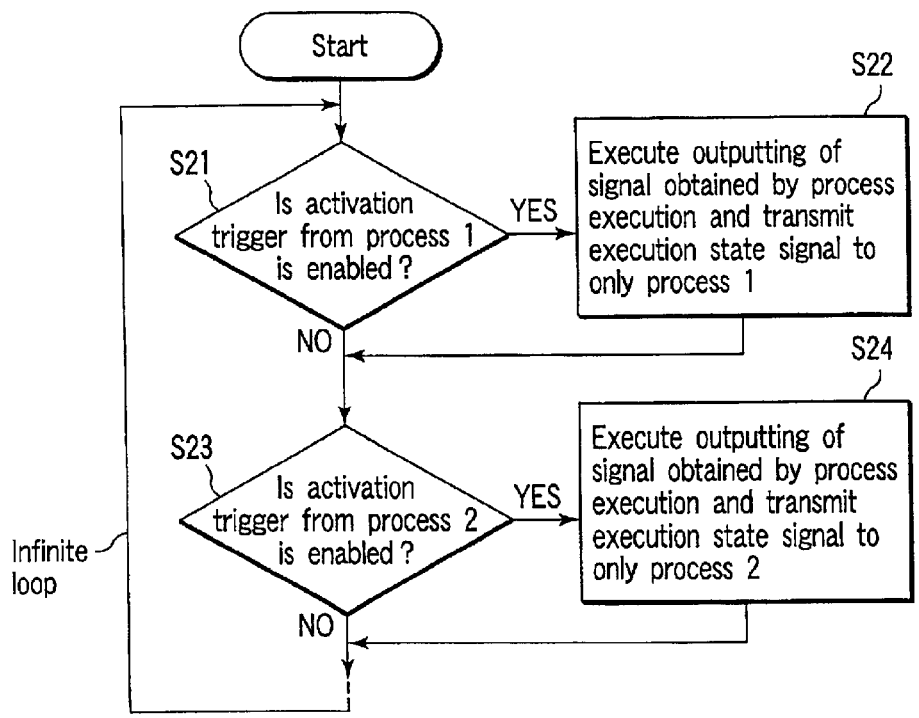
FIG. 15 is a flow chart showing an example of processing by a procedure call switching process.

The procedure call switching process 2012 sequentially executes processing under the following enabling condition for each input trigger (see FIG. 15).

Processing to be executed under the enabling condition for each input trigger:

(1) Other execution state signals are disabled.
(2) An output trigger is enabled. At the same time, an argument signal value, if any, from a process is set as the value of an output argument signal.
(3) When the input execution state signal is enabled, the execution state signal for the process is enabled.
(4) When the input execution state signal is disabled, the process state signal is disabled. At the same time, an input return value signal, if any, is converted into a process return value signal value.

Figure 14:
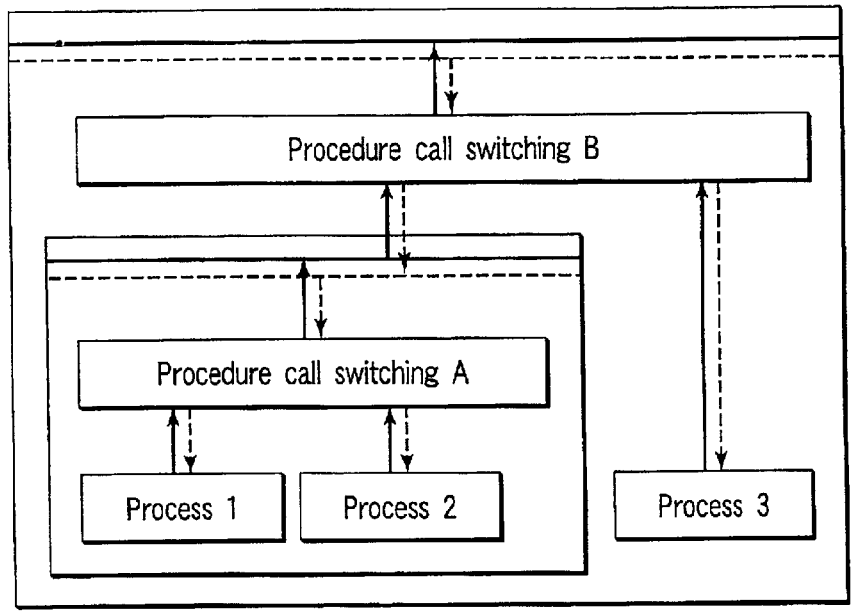
FIG. 14 is a view for explaining an example of a hardware description including hierarchically arranged procedure call switching processes, which is obtained by converting a hardware description including hierarchically arranged value solving processes.

Assume that in a hardware description language model output after forming the procedures in an input software description language model into a hierarchical structure, parallel processes are formed into a hierarchical structure, as shown in FIG. 4. In this case, as shown in FIG. 14, a procedure call switching process is defined with respect to one process at each level, as shown in FIG. 14. If, however, there is no need to perform switching, connection is made without the mediacy of a procedure call switching process.

Figure 13:
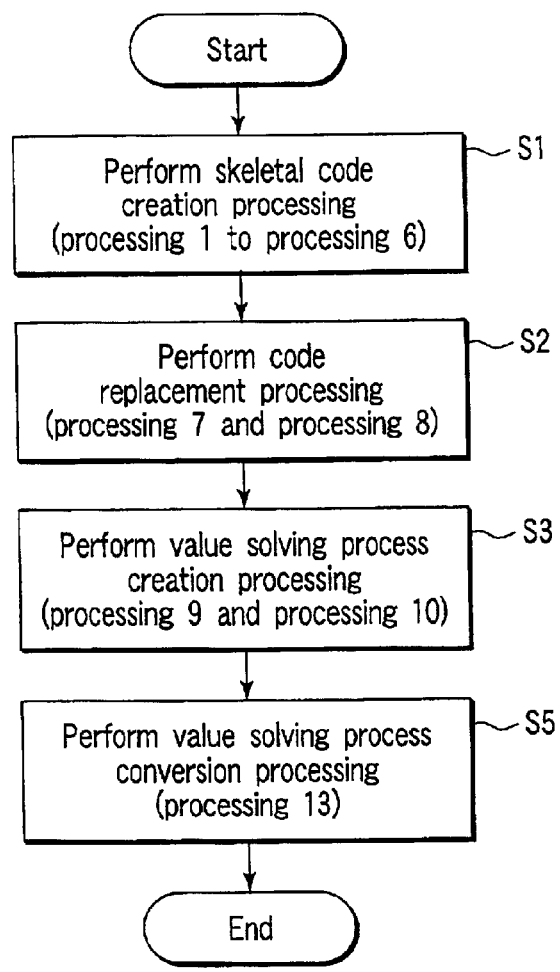
FIG. 13 is a flow chart showing still another example of the procedure executed by the software/hardware language model conversion apparatus according to the embodiment.

FIG. 13 shows a procedure executed by this language model conversion apparatus. According to the procedure shown in FIG. 13, a procedure similar to that shown in FIG. 6 is executed. Procedure calling between parallel programs in a software description language model is also handled as an access to a shared variable between the parallel programs. Following a procedure similar to that shown in FIG. 6, a value solving process is created with respect to procedure calling between parallel programs. In the procedure shown in FIG. 13, value solving process conversion processing (processing 13) (to be described later) is executed by the value solving process conversion section 4 to convert one of the value solving processes (see FIG. 3) which corresponds to procedure calling between the parallel programs into a procedure call switching process (see FIG. 12). Note that processes that do not correspond to procedure calling between the parallel programs are left as value solving processes.

The procedure call solving (switching) process may be executed without going through the value solving processes.

Value solving process conversion processing will be described below.

<Value Solving Process Conversion Processing (Value Solving Process Conversion Section 4)>

(Processing 13) A value solving process for transmitting process control signals (in addition to an execution trigger signal and execution state signal, argument signal and return value data signal) created by processing 4 in the skeletal code creation processing is replaced with the process created by processing 9 in the value solving process creation processing. More specifically, the following replacement is performed.

(Processing 13-1)
First of all, signal definitions are added. As an execution state signal, a signal common to the respective calling-side processes is prepared for each calling process. Likewise, a return value signal is also additionally defined for each calling process.

(Processing 13-2)
Signal replacement is then performed in a calling-side process. More specifically, an execution state signal in the "wait until" condition is replaced with the signal created in processing 13-1. The return value signal reference portion is also replaced in the same manner.

(Processing 13-3)
A value solving process for an execution trigger signal is replaced with the following process.

Inputs to the process include the execution state signal and return value signal output from the called process in addition to an execution trigger signal and argument data signal from each calling process. Outputs from the process include an execution trigger signal and argument data signal to the called process in addition to an execution state signal and return value signal for each calling process signal.

In addition, this process implements the operation shown in FIG. 15 or equivalent operation. For example, the following are operations to be implemented:

(1) There is an infinite loop for monitoring an execution trigger. A condition for exiting from this loop is to enable at least one value of input execution trigger signals.

(2) A conditional branch under the condition that each execution trigger signal is enabled immediately after the flow exits from the loop is prepared. Assume that this conditional branch is set in a sequential serial as follows:

```
if condition 1 then
    processing 1;
end if;
if condition 2 then
    processing 2;
end if;
. . .
```

(3) The following are processes to be performed when the respective conditions are satisfied:
(3-1) An execution trigger signal value for a called process is enabled.
(3-2) The flow waits until an execution state signal from the called process is enabled.
(3-3) An execution state signal to a calling process is enabled.
(3-4) The flow waits until the execution state signal from the called process is disabled.
(3-5) The execution state signal from the calling process is disabled, and the return value signal value from the called process is transmitted to the return value signal for the calling process.

Another example of the processing performed by this language model conversion apparatus will be described next.

Figure 16:
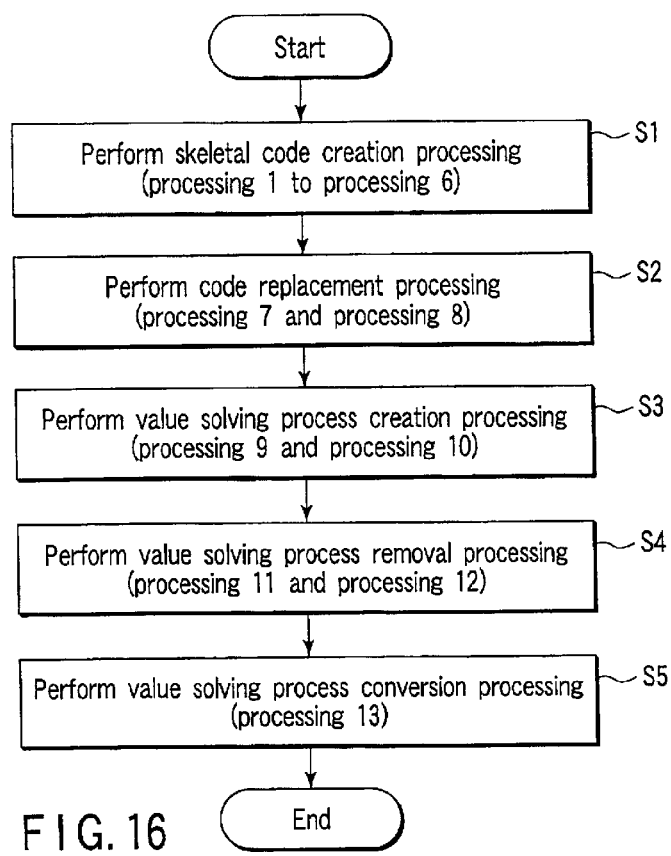
FIG. 16 is a flow chart showing still another example of the procedure executed by the software/hardware language model conversion apparatus according to the embodiment.

FIG. 16 shows another example of the procedure executed by this language model conversion apparatus.

In this procedure, the value solving process conversion processing (processing 13) shown in FIG. 13 is performed after the skeletal code creation processing (processing 1 to processing 6), code replacement creation processing (processing 7 and processing 8), value solving process creation processing (processing 9 and processing 10), and value solving process conversion processing (processing 13) shown in FIG. 13 are performed.

If parallel processes are formed into a hierarchical structure, hierarchically created procedure call switching processes except for the process at the highest level are not created. Input/output signals for a lower-level process are used as input/output signals for the remaining process. Port signals required for this operation are created.

Figure 17:
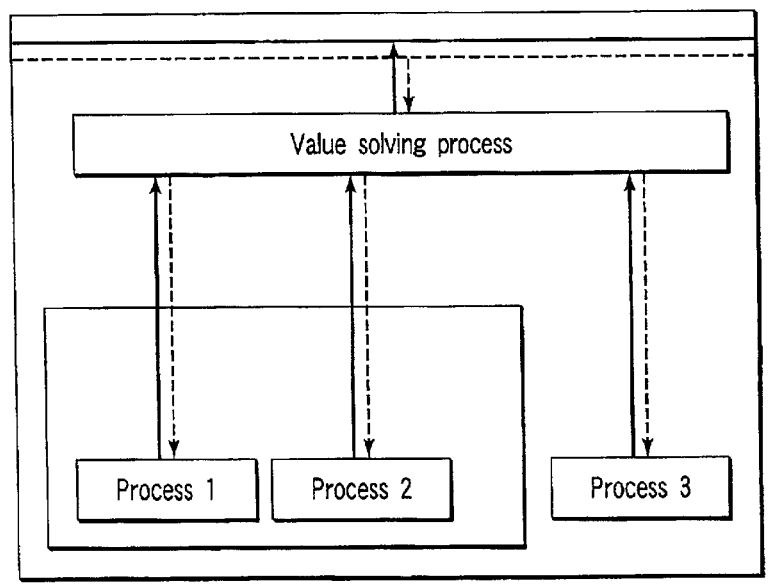
FIG. 17 is a view for explaining an example of a hardware description obtained by deleting all procedure call switching processes except for the procedure call switching process at the highest level, which is obtained by converting a hardware description obtained by deleting all value solving processes except for the value solving process at the highest level.

As a consequence, for example, the structure shown in FIG. 14 is converted into the structure shown in FIG. 17.

As has been described above, according to this embodiment, when parallel programs in a software language are to be converted into a hardware description, the programs can be converted into a hardware operation description that realizes exclusive process execution processing corresponding to procedure calling (i.e., allows exclusive calling).

In addition, this embodiment can handle a case where parallel processes are hierarchically arranged. Note that either an arrangement for forming procedure call solving processes into a hierarchical structure or an arrangement for leaving only the procedure call solving process at the highest level may be selected (in the former case, processing 1 to processing 10 and processing 13 may be performed, whereas in the latter case, processing 1 to processing 13 may be performed). For example, when the number of port signals is to be decreased, the former arrangement is selected, whereas when a process structure is hierarchically deep and any excess wait processing is to be avoided, the latter arrangement is selected.

Each function described above can be implemented as software.

In addition, this embodiment can be practiced as a program for causing a computer to execute predetermined means (or causing the computer to function as predetermined means or to realize predetermined functions) or a computer-readable recording medium on which the program is recorded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A software/hardware language model conversion method for converting a first code described in a software description language to a second code described in a hardware description language, the method comprising:

converting the first code to the second code;

detecting from the second code a plurality of processes that correspond to a plurality of parallel procedures in the first code;

identifying which ones of the plurality of processes assign values to an identical shared variable; and generating a value solving process for the detected processes corresponding to the parallel procedures, wherein the value solving process includes pairs of a data signal and an assignment timing signal from each of the detected processes as an input, and includes any one of data signals corresponding to a change of the assignment timing signal, as an output, wherein said second code includes a component hierarchical structure, wherein said value solving process includes a first value solving process which is generated at higher level in the component hierarchical structure and a second value solving process which is generated at lower level than that of the first value solving process, and the method further includes:

connecting the generated first and second value solving processes to each other.

2. The method according to claim 1, wherein the second value solving process outputs an assignment timing signal which is changed when a value of the data signal is updated to said first value solving process connected to the second value solving process, in addition to said data signal.

3. The method according to claim 1, further comprising:

connecting an input to the second value solving process to an input to the first value solving process; and removing the second value solving process.

4. A software/hardware language model conversion method for converting a first code described in a software description language to a second code described in a hardware description language, the method comprising:

detecting from the first code a plurality of processes that correspond to a plurality of parallel procedures in the second code;

identifying which ones of the plurality of parallel procedures assigns values to an identical shared variable;

converting the first code to the second code; and generating a value solving process for the detected processes corresponding to the parallel procedures, wherein the value solving process includes pairs of a data signal and an assignment timing signal from each of the detected processes as an input, and includes any one of data signals corresponding to a change of the assignment timing signal, as an output, wherein said second code includes a component hierarchical structure, wherein said value solving process includes a first value solving process which is generated at higher level in the component hierarchical structure and a second value solving process which is generated at lower level than that of the first value solving process, and the method further includes:

connecting the generated first and second value solving processes to each other.

5. The method according to claim 4, wherein the second value solving process outputs an assignment timing signal which is changed when a value of the data signal is updated to said first value solving process connected to the second value solving process, in addition to said data signal.

6. The method according to claim 4, further comprising:

connecting an input to the second value solving process to an input to the first value solving process; and removing the second value solving process.

7. A software/hardware language model conversion method for converting a first code described in a software description language to a second code described in a hardware description language, the method comprising:

converting the first code to the second code;

detecting from the second code a plurality of processes that correspond to a plurality of parallel procedures in the first code;

identifying which ones of the plurality of processes assign values to an identical shared variable; and generating a procedure call solving process which exclusively controls a call operation to the parallel procedure by the detected process, wherein the procedure call solving process includes pairs of a call timing signal and an argument data signal, from each of the detected processes, as an input, and includes terminal signal and a return value signal, as an output to the processes, from the called procedure, wherein said second code includes a component hierarchical structure, wherein said procedure call solving process includes a first procedure call solving process which is generated at higher level in the component hierarchical structure and a second procedure call solving process which is generated at lower level than that of the first procedure call solving process, and the method further includes:

connecting the generated first and second procedure call solving processes to each other.

8. The method according to claim 7, further comprising:

connecting an input to the second procedure call solving process to an input to the first procedure call solving process; and removing the second procedure call solving process.

9. A software/hardware language model conversion method for converting a first code described in a software description language to a second code described in a hardware description language, the method comprising:

detecting from the first code a plurality of procedures that correspond to a plurality of parallel procedures in the second code;

identifying which ones of the plurality of parallel procedures assign values to an identical shared variable;

converting the first code to the second code; and generating a procedure call solving process which exclusively controls an operation of a plurality of processes corresponding to the detected procedures, wherein the procedure call solving process includes pairs of a call timing signal and an argument data signal from each of the detected processes, as an input, and includes a terminal signal and a return value signal, as an output to the processes, from the called procedure, wherein said second code includes a component hierarchical structure, wherein said procedure call solving process includes a first procedure call solving process which is generated at higher level in the component hierarchical structure and a second procedure call solving process which is generated at lower level than that of the first procedure call solving process, and the method further includes:

connecting the generated first and second procedure call solving processes to each other.

10. The method according to claim 9, further comprising:

connecting an input to the second procedure call solving process to an input to the first procedure call solving process; and removing the second procedure call solving process.

11. A computer program product comprising:

a computer storage medium and a computer program code mechanism embedded in the computer storage medium for causing a computer to convert a first code described in a software description language to a second code described in a hardware description language, the computer code mechanism comprising:

a computer code device configured to convert the first code to the second code;

a computer code device configured to detect from the second code a plurality of processes that correspond to a plurality of parallel procedures in the first code;

a computer code device configured to identity which ones of the plurality of processes assign values to an identical shared variable; and a computer code device configured to generate a value solving process for the detected processes corresponding to the parallel procedures, wherein the value solving process includes pairs of a data signal and an assignment timing signal from each of the detected processes as an input, and includes any one of data signals corresponding to a change of the assignment timing signal, as an output, wherein said second code includes a component hierarchical structure, wherein said value solving process includes a first value solving process which is generated at higher level in the component hierarchical structure and a second value solving process which is generated at lower level than that of the first value solving process, and the computer program product further includes:

a computer code device configured to connect the generated first and second value solving processes to each other.

12. The computer program product according to claim 11, wherein the second value solving process outputs an assignment timing signal which is changed when a value of the data signal is updated to said first value solving process connected to the second value solving process, in addition to said data signal.

13. The computer program product according to claim 11, further comprising:
- a computer code device configured to connect an input to the second value solving process to an input to the first value solving process; and
- a computer code device configured to remove the second value solving process.

14. A computer program product comprising:
- a computer storage medium and a computer pro tram code mechanism embedded in the computer storage medium for causing a computer to convert a first code described in a software description language to a second code described in a hardware description language, the computer code mechanism comprising:
- a computer code device configured to detect from the first code a plurality of processes that correspond to a plurality of parallel procedures in the second code;
- a computer code device configured to identify which ones of the plurality of processes assign values to an identical shared variable;
- a computer code device configured to convert the first code to the second code; and
- a computer code device configured to generate a value solving process for the detected processes corresponding to the parallel procedures, wherein the value solving process includes pairs of a data signal and an assignment timing signal from each of the detected processes as an input, and includes any one of data signals corresponding to a change of the assignment timing signal, as an output,
- wherein said second code includes a component hierarchical structure, wherein said value solving process includes a first value solving process which is generated at higher level in the component hierarchical structure and a second value solving process which is generated at lower level than that of the first value solving process, and the computer program product further includes:
  - a computer code device configured to connect the generated first and second value solving processes to each other.

15. The computer program product according to claim 14, wherein the second value solving process outputs an assignment timing signal which is changed when a value of the data signal is updated to said first value solving process connected to the second value solving process, in addition to said data signal.

16. The computer program product according to claim 14, further comprising:
- a computer code device configured to connect an input to the second value solving process to an input to the first value solving process; and
- a computer code device configured to remove the second value solving process.

17. A computer program product comprising:
- a computer storage medium and a computer program code mechanism embedded in the computer storage medium for causing a computer to convert a first code described in a software description language to a second code described in a hardware description language, the computer code mechanism comprising:
- a computer code device configured to convert the first code to the second code;
- a computer code device configured to detect from the second code a plurality of processes that correspond to a plurality of procedures in the first code;
- a computer code device configured to identify which ones of the plurality of processes assign values to an identical shared variable; and
- a computer code device configured to generate a procedure call solving process which exclusive controls a call operation to the parallel procedure by the detected process, wherein the procedure call solving process includes pairs of a call timing signal and an argument data signal, from each of the detected processes, as an input, and includes terminal signal and a return value signal, as an output to the processes, from the called procedure,
- wherein said second code includes a component hierarchical structure, wherein said procedure call solving process includes a first procedure call solving process which is generated at higher level in the component hierarchical structure and a second procedure call solving process which is generated at lower level than that of the first procedure call solving process, and the computer program product further includes:
  - a computer code device configured to connect the generated first and second procedure call solving processes to each other.

18. The computer program product according to claim 17, further comprising:
- a computer code device configured to connect an input to the second procedure call solving process to an input to the first procedure call solving process; and
- a computer code device configured to remove the second procedure call solving process.

19. A computer program product comprising:
- a computer storage medium and a computer program code mechanism embedded in the computer storage medium for causing a computer to convert a first code described in a software description language to a second code described in a hardware description language, the computer code mechanism comprising:
- a computer code device configured to detect from the first code a plurality of procedures that correspond to a plurality of parallel procedures in the second code;
- a computer code device configured to identify which ones of the plurality of procedures assign values to an identical shared variable;
- a computer code device configured to convert the first code to the second code; and
- a computer code device configured to generate a procedure call solving process which exclusive controls an operation of a plurality of processes corresponding to the detected procedures, wherein the procedure call solving process includes pairs of a call timing signal and an argument data signal from each of the detected processes, as an input, and includes a terminal signal and a return value signal, as an output to the processes, from the called procedure, wherein said second code includes a component hierarchical structure, wherein said procedure call solving process includes a first procedure call solving process which is generated at higher level in the component hierarchical structure and a second procedure call solving process which is generated at lower level than that of the first procedure call solving process, and the computer program product further includes:

a computer code device configured to connect the generated first and second procedure call solving processes to each other.

20. The computer program product according to claim 19, further comprising:

a computer code device configured to connect an input to the second procedure call solving process to an input to the first procedure call solving process; and a computer code device configured to remove the second procedure call solving process.

\* \* \* \* \*